United States Patent
Onishi et al.

(10) Patent No.: US 6,673,463 B1
(45) Date of Patent: *Jan. 6, 2004

(54) STRUCTURE MATERIAL AND MOLDED PRODUCT USING THE SAME AND DECOMPOSING METHOD THEREOF

(75) Inventors: Hiroshi Onishi, Hirakata (JP); Takahiko Terada, Nara (JP); Yoshikazu Yamagata, Katano (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/809,888
(22) PCT Filed: Feb. 7, 1996
(86) PCT No.: PCT/JP96/00262
§ 371 (c)(1),
(2), (4) Date: Mar. 31, 1997
(87) PCT Pub. No.: WO97/05199
PCT Pub. Date: Feb. 13, 1997

(30) Foreign Application Priority Data

Aug. 2, 1995 (JP) .............................. 7-197761

(51) Int. Cl.$^7$ .................... B32B 15/02; B32B 27/06; B32B 27/20; B32B 27/36
(52) U.S. Cl. ............... 428/480; 428/328; 428/458; 428/694 ST; 428/694 SL; 525/437; 525/444; 524/439; 310/43; 310/44; 310/85; 310/89; 209/3
(58) Field of Search ................... 428/328, 480, 428/458; 525/419, 437, 444; 310/43, 44, 208, 85, 89; 209/3; 524/439

(56) References Cited

U.S. PATENT DOCUMENTS

| | | | |
|---|---|---|---|
| 3,317,519 A | 5/1967 | Lazarus et al. .......... 260/239.3 |
| 3,835,089 A | 9/1974 | Fox et al. ...................... 260/40 |
| 4,908,422 A | 3/1990 | Leitz et al. .................... 527/67 |
| 5,122,561 A | * 6/1992 | Matsumoto et al. ........ 524/323 |
| 5,314,969 A | * 5/1994 | Imaizumi et al. ........... 524/440 |
| 5,480,394 A | * 1/1996 | Ishikawa .................... 604/327 |
| 5,545,485 A | * 8/1996 | Hashitani et al. ........ 428/423.1 |
| 5,545,681 A | * 8/1996 | Honkonen .................. 524/115 |
| 5,814,412 A | * 9/1998 | Terada et al. ............... 428/458 |
| 5,990,247 A | 11/1999 | Terada et al. ............... 525/415 |

FOREIGN PATENT DOCUMENTS

| | | |
|---|---|---|
| EP | 576993 | 6/1993 |
| EP | 749193 | 6/1996 |
| JP | 53092879 | 8/1978 |
| JP | 61-214740 | 9/1986 |
| JP | 36258 | 1/1991 |
| JP | 57126843 | 8/1992 |
| JP | 08-113619 | * 5/1996 |
| WO | 95292050 | 2/1995 |

OTHER PUBLICATIONS

International Search Report for Application No. PCT/JP96/00262; Mailed Jun. 11, 1996.

* cited by examiner

*Primary Examiner*—Vivian Chen
(74) *Attorney, Agent, or Firm*—Renner, Otto, Boiselle & Sklar, LLP

(57) ABSTRACT

A structure material of the present invention consisting essentially of 20 parts by weight or more of a polymer mixture consisting essentially of of a thermoplastic aromatic polyester and a thermoplastic aliphatic polyester on the basis of 100 parts by weight of the structure material. The polymer mixture comprises 3 to 40 parts by weight of the aliphatic polyester on the basis of 100 parts by weight of the polymer mixture.

13 Claims, 2 Drawing Sheets

STRUCTURE MATERIAL AND MOLDED PRODUCT USING THE SAME AND DECOMPOSING METHOD THEREOF

TECHNICAL FIELD

The present invention relates to a structure material and a molded product using the structure material and a decomposing method for such a molded product. More specifically, the present invention relates to a structure material which has excellent mechanical strength and heat resistance and is easily decomposed at the time of disposal and a molded product using such structure material, and a decomposing method thereof.

BACKGROUND ART

In recent years, global environmental issues have been greatly paid attention to. In particular, regarding resin waste, it is desired: (1) to collect and recycle valuable substances from waste in order to avoid depletion of resources; and (2) to reduce the volume of waste to deal with a reduced space for burying refuse. However, the reduction in volume of the resin waste has hardly been promoted, and the resin waste is generally treated by burning.

Regarding a resin molded product, a molded product obtained by integrally molding a structure material together with at least a metal (e.g., a molded product such as a molded motor and molded transformer; a recording medium such as a magnetic tape, a magnetic disc and an opto-magnetic disc) are utilized in consumer equipment, industrial equipment, office equipment or the like. Taking a molded motor as an example, the demand for molded motors has rapidly expanded because of their excellent properties in terms of noise, damping, insulation and maintenance, and teir compact size facilitates automation thereof.

Conventionally, a molded stator of a molded motor used as an alternate current motor, a brushless direct current motor or the like generally has a structure disclosed in Japanese Laid-Open Patent Publication No. 61-214740. The structure will be described with reference to FIGS. 5 and 6. FIG. 5 is a perspective view showing an external appearance of a molded motor having a conventional molded stator 201. FIG. 6 is a perspective view showing the structure of a stator section before being molded. As shown in FIG. 5, the molded motor has a motor section 220 and a molded stator 201 which is integrally molded so as to cover the stator section of FIG. 6 with a molding compound 202. As shown in FIG. 6, the stator section has an iron core 204 wound by a wire 203 via a cylindrical insulator 207. The insulator 207 has a printed board 211 having a wiring pattern 210 at a part of its circumference at one end thereof. The terminal portion of the wire and a lead line 212 are connected on the printed board 211, and an external signal is input to the coil. The molding compound contains a thermoplastic resin such as polyethylene terephthalate, polyethylene, polypropylene and nylon, or a thermosetting resin such as an unsaturated polyester resin, a vinylester resin and a phenol resin as a binder, and further contains calcium carbonate, talc, carbon black or the like as an additive.

It is desirable at the time of disposal of the molded motor to remove the molding compound and recycle metals such as the iron core and the wires which are valuable. In conventional waste treatment, generally, the molding compound is crushed by a shredder at first, and then valuable substances such as the iron core and the wire are recovered from the debris for recycle. However, in such a structure of the molded motor, the iron core and the wire easily cause damage to the teeth of the shredder. Therefore, such a crushing treatment is not favored, and the valuable substances are disposed of without being recycled and then buried in the earth with other waste. Since the aforementioned molding compound is not naturally decomposed while being buried, a silicon steel plate or a copper wire used in the iron core and the wire are left in the land without being recycled, in spite of their high value as an after use material. In addition, since the reduction in volume of the molding compound has not been promoted, it becomes difficult to ensure space for burying it.

In the case where the molding compound contains a thermoplastic resin such as polyethylene terephthalate as the main component, polyethylene terephthalate can be dissolved in a mixing solvent of chlorophenol or metacresol and tetrachloroethane. Therefore, it is theoretically possible to remove such a molding compound by dissolving it in the solvent. However, the dissolution in the solvent takes an extremely long time. Moreover, such a mixing solvent is so toxic that the use thereof is restricted. In addition, in view of recent environmental issues, the use of such a solvent is out of the question. Therefore, in the conventional molded motor, the molding compound cannot be crushed, decomposed, dissolved nor reduced in volume, and thus poses the problem that it is difficult to recycle valuable substances such as the iron core and the wire at the time of disposal.

Regarding the molded product obtained by molding a structure material and a metal, other molded products such as a molded transformer and a magnetic tape have the same problems as the molded motor as described above.

As described above, in view of the decomposition and the reduction in volume of resin waste and recycle of valuable substances, a structure material which is readily decomposed while maintaining excellent characteristics of conventional structure materials is desired.

DISCLOSURE OF THE INVENTION

A structure material of the present invention comprises 20 parts by weight or more of a polymer mixture of a thermoplastic aromatic polyester and a thermoplastic aliphatic polyester on the basis of 100 parts by weight of the structure material. The content of the thermoplastic aromatic polyester in the polymer mixture is larger than the content of the thermoplastic aliphatic polyester.

In one preferred embodiment, the polymer mixture can be decomposed into a monomer unit by a decomposing solution containing a base and a hydrophilic solvent.

In one preferred embodiment, the mixture comprises 3 to 40 parts by weight of the aliphatic polyester on the basis of 100 parts by weight of the mixture.

In one preferred embodiment, the aliphatic polyester is at least one selected from the group consisting of polycaprolactone, polycaprolactone diol, polycaprolactone triol, polyethylene succinate, polybutylene succinate and polylactic acid.

The molded product of the present invention is formed of the structure material described above.

In one preferred embodiment, the molded product of the present invention is a recording medium including a substrate formed of the structure material and a recording layer provided on the substrate.

In one preferred embodiment, the molded product of the present invention is selected from the group consisting of a magnetic tape, a magnetic disc, an opto-magnetic disc and a phase change type optical disc.

In one preferred embodiment, the molded product of the present invention is formed by molding the structure material together with at least a metal.

In one preferred embodiment, the molded product of the present invention is a molded motor having a molded section formed of the structure material integrally molded containing the metal. The structure material contains an inorganic filler.

In one preferred embodiment, the molded section includes an internal molded section covering the metal and an external molded section which is provided outside the internal molded section and whose outermost portion defines an outermost portion of the molded product. The internal molded section is formed of the structure material. The external molded section is formed of a molding compound containing a thermosetting resin.

In one preferred embodiment, the molded product of the present invention is a molded motor having a molded section formed of the structure material integrally molded containing the metal and an insulator. A part of the insulator penetrates the molded section and is exposed flush with the surface of the molded section.

In one preferred embodiment, the molded section is formed of a molding compound containing a thermosetting resin. The insulator comprises 20 parts by weight or more of a polymer mixture of a thermoplastic aromatic polyester and a thermoplastic aliphatic polyester on the basis of 100 parts by weight of the insulator. The aliphatic polyester is at least one selected from the group consisting of polycaprolactone, polycaprolactone diol, polycaprolactone triol, polyethylene succinate, polybutylene succinate and polylactic acid.

A decomposing method for a structure material of the present invention includes the step of immersing the structure material in a decomposing solution containing a base and a hydrophilic solvent at a temperature lower than the boiling point of the hydrophilic solvent. The structure material comprises 20 parts by weight or more of a mixture of a thermoplastic aromatic polyester and a thermoplastic aliphatic polyester on the basis of 100 parts by weight of the structure material, and the content of the thermoplastic aromatic polyester in the mixture is larger than the content of the thermoplastic aliphatic polyester.

A decomposing method for a molded product of the present invention is a decomposing method for a molded product formed by molding a structure material together with at least a metal. The structure material comprises 20 parts by weight or more of a mixture of a thermoplastic aromatic polyester and a thermoplastic aliphatic polyester on the basis of 100 parts by weight of the structure material, and the content of the thermoplastic aromatic polyester in the mixture is larger than the content of the thermoplastic aliphatic polyester. The method includes the steps of immersing the molded product in a decomposing solution containing a base and a hydrophilic solvent at a temperature lower than the boiling point of the hydrophilic solvent, and decomposing at least a part of the structure material forming the molded product and then separating and collecting the metal.

In one preferred embodiment, the hydrophilic solvent is a mixed solvent of water and lower alcohol.

In one preferred embodiment, the separation and the collection of the metal are performed in a state where the structure material remains moist.

BEST MODE FOR CARRYING OUT THE INVENTION

A. Structure Material

Figure 1:
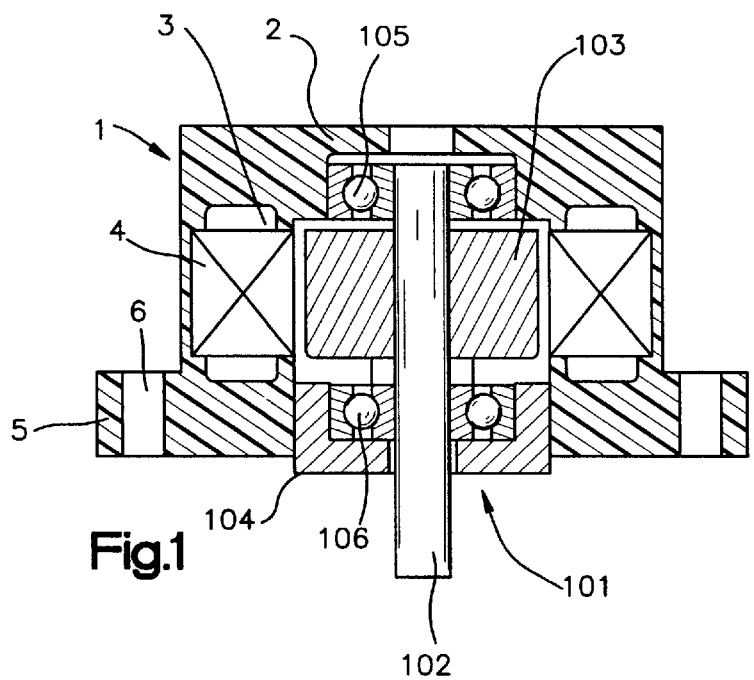
FIG. 1 is a schematic cross sectional view showing an embodiment of a molded motor as an example of a molded product of the present invention.

A thermoplastic aromatic polyester used in a structure material of the present invention is obtained by condensation-polymerizing aromatic polybasic acid and glycol by a known method. Typical examples of the thermoplastic aromatic polyester include polyethylene terephthalate represented by Formula (I), polybutylene terephthalate represented by Formula (II), polycyclohexane terephthalate represented by Formula (III) and polybutylene naphthalate represented by Formula (IV).

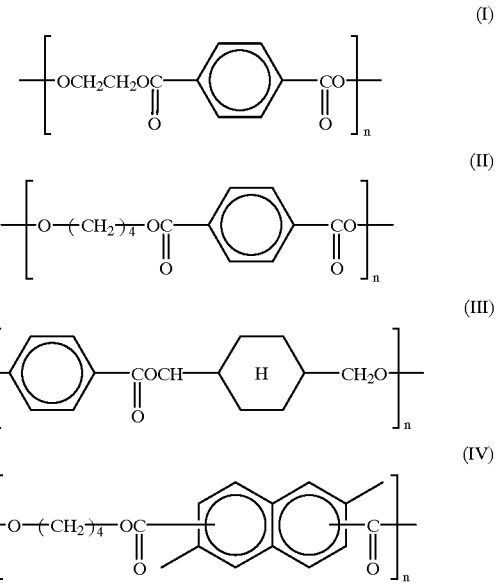

Examples of the aromatic polybasic acid include phthalic anhydride, isophthalic acid, terephthalic acid, diphenyl carboxylic acid. They can be used singularly or in combination thereof. Isophthalic acid is preferable because of its low cost and its excellent strength, and terephthalic acid is preferable because of its exceptional strength.

Examples of the glycol include ethylene glycol, propylene glycol, diethylene glycol, dipropylene glycol, neopentyl glycol, hexamethylene glycol, polyethylene glycol, butanediol. They can be used singularly or in combination thereof. Ethylene glycol is preferable because of its low cost, and butanediol is preferable because of its high crystallinity and resulting excellent strength.

Exemplary examples of a specific combination of an aromatic polybasic acid and glycol are as follows: isophthalic acid and ethylene glycol; isophthalic acid and butanediol; and terephthalic acid and butanediol.

The thermoplastic aliphatic polyester used in the structure material of the present invention can be easily decomposed in a decomposing solution containing a base and a hydrophilic solvent described later. Examples of the aliphatic polyester include a polymer obtained by ring-opening polymerization of lactone such as polycaprolactone and polypropiolactone represented by Formula (V); a polymer of hydroxylic acid such as polylactic acid represented by Formula (VI) and polyglycol acid represented by Formula (VII); a polymer having a functional group in its terminal such as polycaprolactone diol represented by Formula (VIII) and polycaprolactone triol represented by Formula (IX); a copolymer of glycol and aliphatic dicarboxylic acid represented by Formula (X); and poly(3-hydroxyalkanoate) obtained by fermentation of microorganism such as poly(3-hydroxypropionate), poly(3-hydroxybutylate), poly(3-hydroxyvalerate), poly(3-hydroxyoctanoate) or the like.

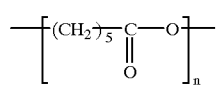

(V)

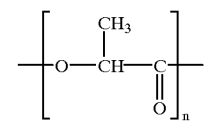

(VI)

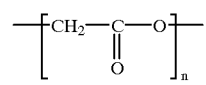

(VII)

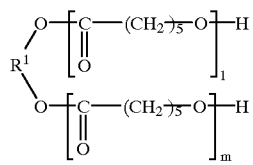

(VIII)

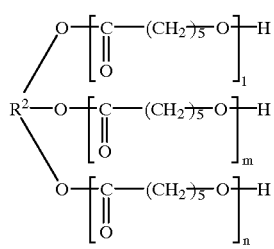

(IX)

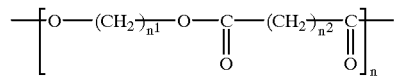

(X)

where $R^1$ and $R^2$ are independently a hydrocarbon group having 1 to 20 carbon atoms, and $n^1$ and $n^2$ are independently an integer of 1 to 6.

Specific examples of the copolymer represented by Formula (X) include polybutylene succinate, polyethylene malonate, polyethylene succinate, polyethylene adipate, polyethylene pimelate, polyethylene suberate, polyethylene azelate, polyethylene sebacate, polyethylene decamethylate, polytetramethylene succinate, polypentamethylene succinate, polyhexamethylene succinate, polytrimethylene adipate, polytetramethylene adipate, polyhexamethylene adipate, polytrimethylene sebacate, polytetramethylene sebacate, polyhexamethylene sebacate, polyethylethylene succinate, poly-1,2-dimethylethylene succinate, polyethylethylene adipate, polymethylethylene sebacate, poly-1-methyltrimethylene succinate, poly-2,2-dimethyltrimethylene succinate, poly-1-methyltrimethylene adipate, poly-2,2-dimethyltrimethylene adipate, poly-1-methyltrimethylene sebacate, poly-2,2-dimethyltrimethylene sebacate, and a copolymer of ε-caprolactone, adipic acid and hexamethylenediol.

Among the thermoplastic aliphatic polyesters, polycaprolactone, polycaprolactone diol, polycaprolactone triol, polybutylene succinate and polylactic acid are preferable, because of their excellent decomposability and easy industrial production. Polycaprolactone and polylactic acid are especially preferable, because of their decomposability.

A polymer mixture of the thermoplastic aromatic polyester and the thermoplastic aliphatic polyester can be decomposed into a monomer unit by a decomposing solution containing a base and a hydrophilic solvent described later.

In the polymer mixture, the content of the thermoplastic aromatic polyester is larger than that of the thermoplastic aliphatic polyester. In the case where the content of the thermoplastic aromatic polyester is smaller than that of the thermoplastic aliphatic polyester, it is likely that the mechanical strength of the obtained structure material is insufficient. Furthermore, since the obtained structure material is easily hydrolyzed, it is likely to be difficult to use at a high humidity. More specifically, the content of thermoplastic aliphatic polyester in the polymer mixture is preferably 3 to 40 parts by weight, more preferably 10 to 30 parts by weight, and most preferably 10 to 25 parts by weight on the basis of 100 parts by weight of the mixture. In the case where the content of the thermoplastic aliphatic polyester is below 3 parts by weight, it is likely that the decomposability of the obtained structure material (e.g., a decomposing rate and the degree of decomposition into a monomer unit) is insufficient.

In the polymer mixture contained in the structure material of the present invention, particularly preferred examples of the combination of the thermoplastic aromatic polyester and the thermoplastic aliphatic polyester are as follows: polyethylene terephthalate and polycaprolactone (weight ratio 85:15); polyethylene terephthalate and polylactic acid (weight ratio 80:20); polyethylene terephthalate and polybutylene succinate (weight ratio 85:15); polybutylene terephthalate and polylactic acid (weight ratio 80:20); and polybutylene terephthalate and polybutylene succinate (weight ratio 85:15).

The structure material of the present invention contains the above-mentioned polymer mixture in an amount of preferably 20 parts by weight or more, preferably 30 parts by weight or more, and more preferably 40 parts by weight or more on the basis of 100 parts by weight of the structure material. In the case where the content of the polymer mixture is below 20 parts by weight, it is difficult for a decomposing solution to permeate into the structure material. As a result, it is likely that the decomposition and the reduction in volume of the structure material takes too much time.

The structure material can optionally further contain a releasing agent, wax, a coloring agent, a thickener, a filler or the like.

Examples of the releasing agent include stearic acid, zinc stearate, calcium stearate or the like.

Examples of the wax include Hoechst wax, carnauba wax, paraffin or the like.

Examples of the coloring agent include titanium white, chromium oxide, carbon black or the like.

Examples of the thickener include beryllium oxide, magnesium oxide, magnesium hydroxide, calcium oxide, calcium hydroxide, zinc oxide, benzoic acid, phthalic anhydride, tetrahydrophthalic anhydride, maleic anhydride or the like.

Examples of the filler include an inorganic filler, for example, carbonate such as calcium carbonate and magnesium carbonate, sulfate or sulfite such as calcium sulfate, barium sulfate and calcium sulfite, silicate such as clay, mica, glass balloon, montmorillonite, silicic acid, kaolin, talc, oxides such as silica, diatomaceous earth, iron oxide, pumice balloon, titanium oxide and alumina, hydroxides such as aluminum hydroxide and magnesium hydroxide, graphite, glass fibers, carbon fibers and asbestos fibers; and an organic filler, for example, wood powder, grain fibers such as chaffs, cotton, paper stripes, nylon fibers, polyethylene fibers, lumber, pulp, cellulose or the like.

In the case where a lightweight molded product requiring operability is desired, polyethylene fibers are preferably used. The structure material comprising polyethylene fibers as a filler has exceptional specific strength and specific elastic modulus in view of light weight.

The filler is added in a range of, preferably more than 0 to 80 parts by weight, more preferably 20 to 70 parts by weight, and most preferably 30 to 60 parts by weight, on the basis of 100 parts by weight of the structure material. By adding the filler in such a range, the mechanical strength of the structure material is improved. Furthermore, since the thermoplastic aliphatic polyester is sufficiently dispersed in the structure material, permeability of the decomposing solution is improved and the structure material having an excellent decomposability can be obtained.

Furthermore, the structure material of the present invention can comprise a thermoplastic resin other than the aforementioned polyesters (i.e., the thermoplastic aromatic polyesters and the thermoplastic aliphatic polyesters). Examples of such a thermoplastic resin include polyethylene, polypropylene, polystyrene, polyvinyl acetate, polymethylmethacrylate, poly(ethylene vinyl alcohol), an acrylic copolymer, a methacrylic copolymer, a styrene-butadiene block copolymer, acrylonitrile-butadiene-styrene copolymer. The content and the type of these thermoplastic resins can be suitably changed depending on a desired characteristic of the structure material.

The structure material can be formed by injection molding, transfer molding, compression molding, inflation, casting or the like.

Known conditions can be applied to the molding conditions. For example, in the case of the injection molding, the conditions of a cylinder temperature of 250° C., a mold temperature of 100° C., and an injection pressure of 700 kg/cm$^2$ are preferable.

As described below, the structure material of the present invention can be formed into a variety of molded products. Furthermore, since the structure material itself has excellent decomposability, the structure material of the present invention can be used for fiber reinforced plastic (FRP), sheet molding compound (SMC) or the like for the purpose of volume reduction and collecting a filler (e.g., glass fibers and inorganic particles), in addition to specific molded products.

B. Molded Product

The molded product of the present invention can be formed by using the structure material of the present invention. Specific examples of the molded product include a molded article (e.g., a molded motor, a molded stator, a molded transformer); a general electric parts (e.g., a deflecting yoke of a TV, a reflecting plate of a lamp, a connector, a housing of a relay and switches); an automobile molded product (e.g., a bumper, a clutch box, an instrument panel); a recording medium (e.g., a magnetic tape, a magnetic disc, an opto-magnetic disc, a phase change type optical disc); and a general resin molded product (e.g., a plastic container, a cartridge of a magnetic tape). Preferably, the molded product of the present invention is a molded product containing a metal which is a valuable substance. Specific examples of the metals contained in the molded product include copper, iron, aluminum, a cobalt-phosphorus alloy, a cobalt-nickel alloy, chromium dioxide, cobalt modified iron oxide and nickel.

Hereinafter, preferred examples of the molded product of the present invention will be described. However, the molded product of the present invention is not limited to any of the examples below.

Preferred embodiments will be described with reference to the accompanying drawings by taking a molded motor as an example of the molded product of the present invention.

A preferred embodiment of a molded motor will be described with reference to FIG. 1. FIG. 1 is a cross sectional view showing an embodiment of a molded motor of an exemplary molded product of the present invention. The molded motor includes a motor section 101 and a molded stator 1. The molded stator 1 includes an iron core 4, a wire 3 winding round the iron core 4, and a molded section 2 formed of a structure material integrally molded with the iron core 4 and the wire 3. The outermost portion of the molded section 2 defines the outermost portion of the molded stator 1. The motor section 101 is provided at an opening of the molded section 2, and includes at least a rotating shaft 102 and a rotator 103 attached to the rotating shaft 102. The motor section 101 is supported by a bracket 104. The rotator 103 is axially supported by a bearing 105 provided in an upper wall of the opening and a bearing 106 provided in the bracket. Although it is not shown, the end portion of the wire 3 extends to a portion above the shaft of the molded stator, and is connected to a lead wire there. Thus a signal can be input through the lead wire. The molded stator 1 may be further provided with a flange section 5 having a plurality of provision bores 6.

The aforementioned structure materials can be used for the molding compound constituting the molded section 2.

The maximum thickness of the molded section can be varied depending on the use, but is preferably 0.1 to 20 mm, more preferably 0.2 to 10 mm, and most preferably 0.2 to 5 mm in the present invention.

Figure 2:
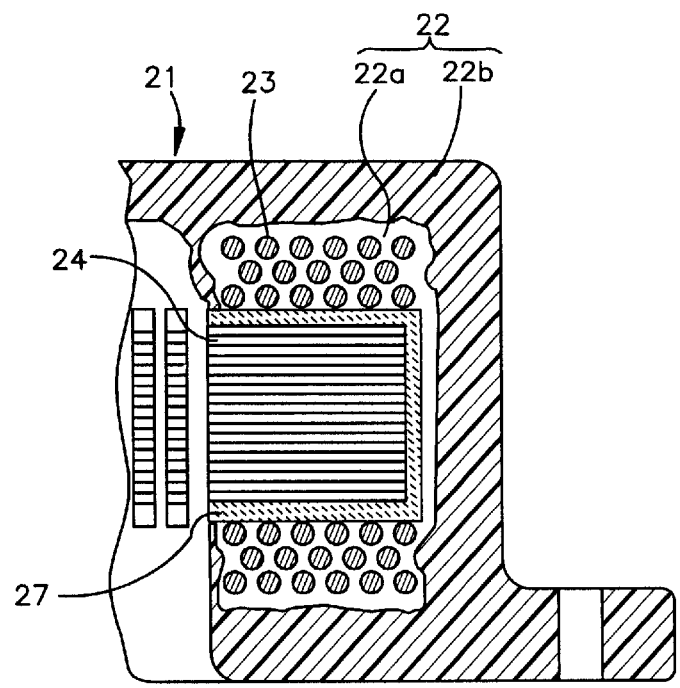
FIG. 2 is a cross sectional view of a primary part of another embodiment of a molded motor as an example of a molded product of the present invention.
Figure 3:
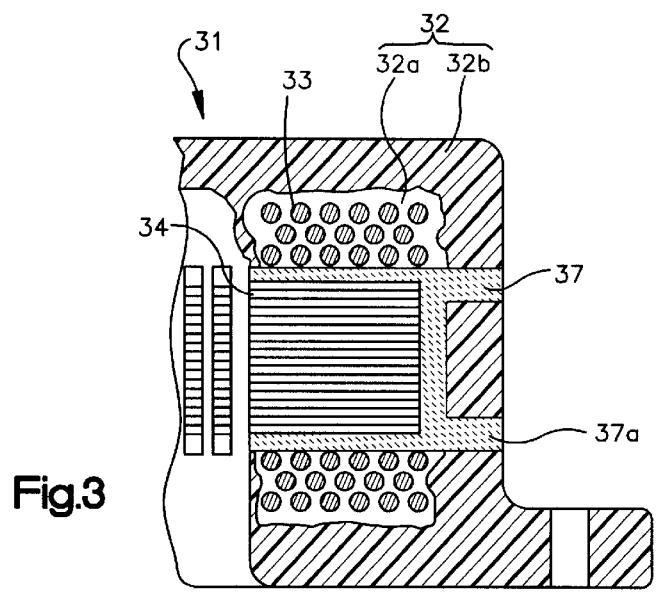
FIG. 3 is a cross sectional view of a primary part of still another embodiment of a molded motor as an example of a molded product of the present invention.

Another preferred embodiment of a molded motor will be described with reference to FIG. 2. FIG. 2 is a cross sectional view of a primary part of a molded motor of this embodiment. Hereinafter, in the figures, like reference numerals correspond to like components. More specifically, the number of units in reference numerals in FIGS. 2 and 3 is identical with the number of corresponding components in FIG. 1, and the number of tens represents the figure number.

This embodiment shows the case where the molded section 22 includes an internal molded section 22a and an external molded section 22b. As shown in FIG. 2, the molded stator 21 includes an iron core 24, an insulator 27 covering at least a part of the iron core 24, a wire 23 winding round the iron core 24 and the insulator 27, and the molded section 22 made of a molding compound integrally molded with the iron core 24, the insulator 27 and the wire 23. The molded section 22 includes the internal molded section 22a covering at least a part of the iron core 24 and the external molded section 22b which is provided outside the internal molded section 22a and whose outermost portion defines the outermost portion of the molded stator 21.

glycol represented by Formula (XII) and a copolymer of isophthalic acid and maleic anhydride and propylene glycol represented by Formula (XIII).

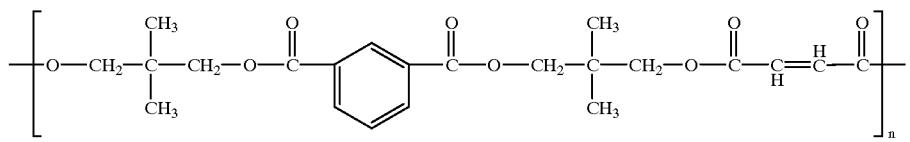

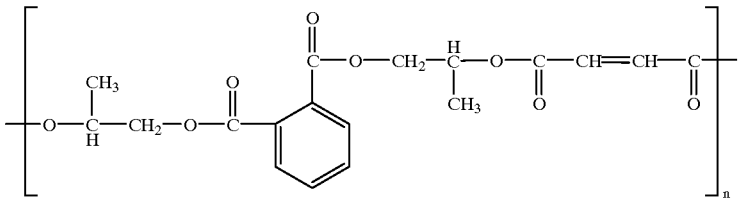

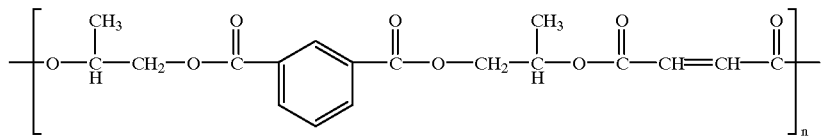

The maximum thickness of the external molded section can be varied depending on the use, but is preferably 0.1 to 20 mm, more preferably 0.2 to 10 mm, and most preferably 0.2 to 5 mm in the present invention.

The thickness of the internal molded section can also be varied depending on the use, as with the external molded section, but is preferably 0.5 to 10 mm, more preferably 1 to 7 mm, and most preferably 2 to 5 mm in the present invention.

The internal molded section 22a is formed of the aforementioned structure material.

The external molded section 22b is formed of a thermosetting (or photocurable) molding compound containing a thermosetting resin. The thermosetting resin is not particularly limited, as long as it is suitable for the intended purpose. Typical examples thereof include an unsaturated polyester resin, a vinyl ester resin and a phenol resin. The case of an unsaturated resin will be only described herein.

The unsaturated polyester can be obtained by a known condensation polymerization of unsaturated polybasic acid and saturated polybasic acid and glycol. Examples of the unsaturated polybasic acid include maleic anhydride, fumaric acid, itaconic acid and citraconic acid. Examples of the saturated polybasic acid include phthalic anhydride, isophthalic acid, terephthalic acid, adipic acid, sebacic acid, tetrahydrophthalic anhydride, methyltetrahydrophthalic anhydride, endomethylene tetrahydrophthalic anhydride, chlorendic acid and tetrabromophthalic anhydride. Examples of the glycol include ethylene glycol, propylene glycol, diethylene glycol, dipropylene glycol, neopentyl glycol, 1,3-butanediol, 1,6-hexanediol, bisphenol A hydride, a bisphenol A propylene oxide and dibromoneopentyl glycol.

Examples of the preferred unsaturated polyester include a copolymer of isophthalic acid and fumaric acid and neopentyl glycol represented by Formula (XI), a copolymer of phthalic anhydride and fumaric anhydride and propylene Preferably, the molding compound forming the external molded section can suitably contain a curing agent, an addition-polymerizable monomer and a low shrink agent or the like other than the aforementioned additives which can be added to the structure material.

Examples of the curing agent include benzoyl peroxide, t-butylperbenzoate, t-butylperoxybenzoate, t-butylperoxylaurate, t-butylperoxy-2-ethylhexanoate, t-butylperoxyoctoate, or the like.

Examples of the addition-polymerizable monomer include styrene, vinyl toluene, a-methylstyrene, methyl methacrylate, vinyl acetate, diallylphthalate, diallylisophthalate, diallyltetrabromophthalate, phenoxyethyl acrylate, 2-hydroxyethyl acrylate, 1,6-hexanediol diacrylate or the like.

Examples of the low shrink agent include a thermoplastic resin such as polyethylene, polypropylene, polystyrene, polyvinyl acetate, polymethyl methacrylate, poly(ethylene vinyl alcohol), an acrylic copolymer, a methacrylic copolymer, a styrene-butadiene block copolymer, and an acrylonitrile-butadiene-styrene copolymer.

A thermoplastic resin such as a thermoplastic aliphatic polyester, a thermoplastic aromatic polyester and polyethylene can be used for the insulator 27. Since the insulator 27 requires a shape preservation effect of the wire 3 during molding, it is preferable to use a material having a softening point or a melting point above the temperature at the time of molding, e.g., about 100° C. or more, so that the insulator is not softened during molding. Furthermore, the molding temperature of the internal molded section is preferably equal to or lower than the temperature at which the insulator 27 is deformed. It is especially preferable to use a polymer mixture of a thermoplastic aliphatic polyester and a thermoplastic aromatic polyester or a thermoplastic aliphatic polyester for the insulator 27, because it is possible to separate the wire 23 and the iron core 24 during decomposition. In the case where a polymer mixture of a thermoplastic aliphatic polyester and a thermoplastic aromatic polyester is used, by using a thermoplastic aliphatic polyester having a melting point exceeding 100° C., the melting point of the entire mixture exceeds 100° C. Therefore, it is possible to select a thermoplastic aromatic polyester in a wide range. An example of the aliphatic polyester having a melting point exceeding 100° C. is a copolymer resin represented by Formula (X).

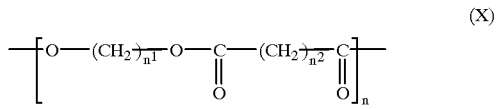
(X)

Alternatively, the external molded section 22b is formed of a thermoplastic molding compound containing only a thermoplastic aromatic polyester as a binder.

The molded motor of this embodiment having the above-mentioned configuration has advantages over the molded motor shown in FIG. 1 because of its environmental stability. For example, such a molded motor is stable in a high temperature and high humidity condition where aliphatic polyester is readily decomposed, and thus is usable in such a condition. Furthermore, such a molded motor has exceptional mechanical strength.

In decomposing the molded motor of this embodiment having such a configuration, before immersing the molded motor in a decomposing solution, the internal molded section is preferably exposed so as to be in contact with the decomposing solution. This is because the external molded section is not easily decomposed by the decomposing solution. The exposure of the internal molded section can be performed by scratching with a saw, a chisel or the like, or by opening with a drill. After immersing the molded motor in the decomposing solution, the internal molded section is decomposed so as to form a hollow portion in the inside of the molded section. Therefore, metals can be easily separated and collected.

Still another preferred embodiment of a molded motor of an exemplary molded product of the present invention will be described with reference to FIG. 3. FIG. 3 is a cross sectional view showing a primary part of a molded motor of this embodiment.

This embodiment shows the case where a part of an insulator 37 is exposed flush with the surface of an external molded section 32b. As shown in FIG. 3, a molded stator 31 includes an iron core 34, an insulator 37 covering at least a part of the iron core 34, a wire 33 winding around the iron core 34 and the insulator 37, and the molded section 32 made of a molding compound integrally molded with the iron core 34, the insulator 37 and the wire 33. The molded section 32 includes the internal molded section 32a covering at least a part of the iron core 34 and the external molded section 32b which is provided outside the internal molded section 32a and whose outermost portion defines the outermost portion of the molded stator 31. A part of the insulator 37 penetrates the external molded section 32b so as to be exposed flush with the surface of the external section 32b.

In the molded stator of this embodiment having such a configuration, since the insulator 37 has an exposed portion 37a, the decomposing solution is directly in contact with the exposed portion 37a. Thus, the exposed portion 37a is first decomposed and then decomposition sequentially proceeds to the inside of the insulator and the molded section 32 with ease. Thus, since a hollow is formed in the inside of the molded section, the molded section 32 is easily removed by an external mechanical impact, thus making it remarkably easy to separate the wire 33 and the iron core 34.

The preferred embodiments of a molded motor of an exemplary molded product of the present invention can be suitably combined. For example, the configuration of the insulator shown in FIG. 3 can be applied to the molded stator constituted by the molded section having the internal section and the external section shown in FIG. 2, and can be applied to the molded stator constituted by the single molded section shown in FIG. 1.

The molded motor of an exemplary molded product of the present invention can be applied to a brushless direct current motor, an alternate current motor, a linear motor or the like.

The molded product of the present invention can be applied to an insulator of a general motor (i.e., non-molded motor). In the case where the molded product of the present invention is used for the insulator of the motor, merely by immersing the motor in a decomposing solution described later, the insulator can be decomposed so as to be removed. For this reason, it is easy to separate and collect metals constituting the motor, and recycle of the metals is facilitated. Since the insulator of the motor is generally formed thin, it is quite easily decomposed by the decomposing solution. The application to such an insulator further has the following advantages: Defectives which failed a conductivity test before being molded in the production of the molded motor were disposed as industrial waste in a state before being molded. This is because the removal of the insulator is difficult. By applying the molded product of the present invention to the insulator, it is possible to remove the insulator simply by immersing the detectives in the decomposing solution. As a result, an effective recycle of the metals becomes possible.

Furthermore, the molded product of the present invention can be applied to the insulator of the conventional molded motor. In the case where the molded product of the present invention is used for the insulator of the conventional molded motor, an ordinary crushing treatment should be performed to remove the molded section. However, a metal stripe after being crushed and selected is immersed in the decomposing solution so that the insulator which adheres to the metal stripe can be completely removed. Therefore a significantly better metal stripe can be collected than a conventional one.

Next, a recording medium which is another example of the molded product of the present invention will be described. Herein, a magnetic tape will be described as an example of the recording medium.

Figure 4:
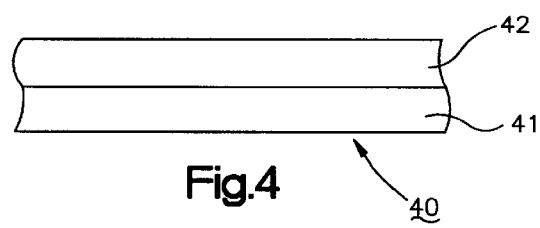
FIG. 4 is a schematic partial cross sectional view of a magnetic tape as an example of a molded product of the present invention.
Figures 5, 6:
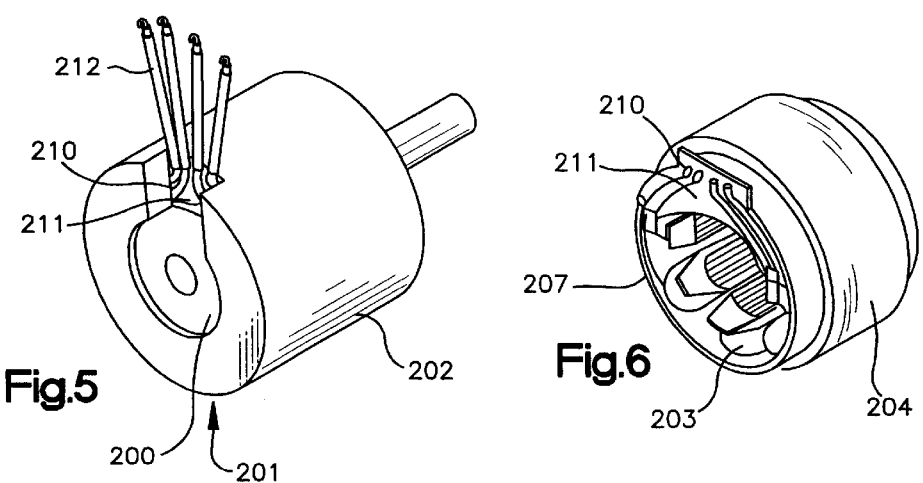
FIG. 5 is a perspective view showing an external appearance of a conventional molded motor.
FIG. 6 is a perspective view showing an appearance of a stator section of the conventional molded motor.

FIG. 4 is a schematic partial cross sectional view of a magnetic tape. The magnetic tape 40 includes a substrate 41 and a recording layer 42 formed on the substrate.

The substrate 41 can be formed using the aforementioned structure material of the present invention. In the case where the structure material of the present invention is used for the substrate of the magnetic tape, a content of a thermoplastic aromatic polyester in a polymer mixture of the thermoplastic aromatic polyester and a thermoplastic aliphatic polyester is preferably 30 parts by weight or less on the basis of 100 parts by weight of the mixture. This is because a substrate having a particularly excellent tensile strength can be obtained.

Any of known sheet forming methods can be employed as a method for forming the substrate, and not particularly limited. By forming the aforementioned structure material into a film having a desired thickness, the substrate 41 can be obtained. Furthermore, after forming the recording medium 42 described later on the substrate 41, the resultant substrate is cut in a desired width so as to obtain the magnetic tape 40. The thickness of the substrate can be varied depending on the use, but preferably 4 to 10 μm.

The recording layer 42 is formed by a known method using a known magnetic recording material. Examples of the magnetic recording material include iron oxide, chromium oxide, cobalt modified iron oxide, Ba ferrite and a cobalt-nickel alloy. Examples of the method for forming the recording layer include a method in which a solution containing magnetic recording material powder and a binder is applied to a substrate and then dried; and a method such as evaporation and sputtering in which the recording layer is directly formed on the substrate.

Examples of the binder contained in the solution in the case where the solution is applied include a vinyl chloride-vinyl acetate copolymer, a vinyl chloride-acrylonitrile copolymer, nitrocellulose, thermoplastic aromatic polyester, thermoplastic aliphatic polyester, polyurethane, polyamide or the like. They can be used singularly or in combination thereof. A binder containing a polymer mixture of thermoplastic aromatic polyester and thermoplastic aliphatic polyester, or thermoplastic aliphatic polyester is preferable because it makes it easy to collect magnetic recording material powder during decomposition. Examples of a solvent contained in the solution include methylethyl ketone, cyclohexanone, butyl acetate and toluene. They can be used singularly or in combination thereof. Furthermore, if necessary, the solution can contain a surfactant; a dispersant such as a silane coupling agent: a lubricant such as aliphatic amide, fluidized paraffin; an antistatic agent such as carbon black; and an abrasive such as aluminum and silicon carbonate.

Furthermore, if necessary, the magnetic tape 40 can include an undercoat layer between the substrate 41 and the recording layer 42, a backcoat layer on the substrate surface in the opposite side of the recording layer, a topcoat layer on the surface of the recording layer or the like.

Furthermore, in the case where the molded product is a magnetic tape (e.g., a music tape or a video tape), it is preferable that a housing such as a cartridge protecting the tape is formed of the structure material of the present invention. Since the housing is decomposed by the decomposing solution, it is not necessary to separate the housing. As a result, the collection of the magnetic recording material is further facilitated.

C. Decomposing Solution

The polymer mixture contained in the structure material of the present invention can be decomposed into a monomer unit by a decomposing solution comprising a base and a hydrophilic solvent. Thus, the decomposition and the reduction in volume of the structure material of the present invention can be achieved. As a result, the reduction in volume of the molded product of the present invention and the separation and collection of metals contained in the molded product can be achieved.

The base contained in the decomposing solution is dissociated in water (i.e., by contacting water) so as to generate a hydroxyl group. Examples of such a base include a metal hydroxide such as a sodium hydroxide and a potassium hydroxide; a metal oxide such as a sodium oxide and a calcium oxide; a metal alkoxide such as sodium ethoxide and potassium t-butoxide. They can be used singularly or in combination of two or more. Sodium hydroxide is preferable in view of cost.

The base can be contained in the decomposing solution in the range of, preferably 0.1 to 50% by weight, more preferably 1 to 30% by weight, and most preferably 2 to 20% by weight. In the case where the content is below 1% by weight, a catalyst effect during decomposition is low. When the content exceeds 50% by weight, it is difficult to prepare the decomposing solution. Furthermore, since the viscosity of the decomposing solution becomes excessively high, permeability into the structure material deteriorates, and thus decomposability deteriorates.

The hydrophilic solvent contained in the decomposing solution includes water and an organic solvent having a satisfactory hydrophilicity with water. Examples of the hydrophilic solvent include water; lower alcohol such as methanol, ethanol and isopropyl alcohol; glycol such as ethylene glycol, propylene glycol, diethylene glycol; ketone such as acetone and methylethyl ketone; ether such as dioxane and tetrahydrofuran. They can be used singularly or in combination of two or more. Lower alcohol and a mixed solvent of lower alcohol and water are preferable because they have excellent decomposability at room temperature. Particularly preferred examples of lower alcohol include methanol and ethanol.

In the case where the mixed solvent of lower alcohol and water is used as a hydrophilic solvent of the decomposing solution, water is contained in the mixing solvent in a range of, preferably 1 to 60% by weight, and more preferably 3 to 50% by weight. When the content of water is not within such a range, a particularly excellent effect by mixing lower alcohol and water cannot sufficiently be obtained. Furthermore, in order to maintain the particularly excellent effect by mixing lower alcohol and water, it is preferable that the content of water in the decomposing solution is constantly within the above-mentioned range during decomposition. In other words, in the case where the decomposition takes a long time, or the decomposing solution is reused, it is preferable to add water in a suitable amount. Specific examples of the mixed solvent of lower alcohol and water are as follows: water and methanol (weight ratio 50:50); water and ethanol (weight ratio 50:50); and water and ethanol (weight ratio 95:5).

The decomposing solution can optionally contain an additive such as a surfactant, an anti-volatilizing agent and a preservative. By comprising such an additive, it is possible to suitably adjust the characteristics (e.g., surface tension, volatilizability and prevervability) of the decomposing solution. The content of the additive can be varied depending on the type of the additive and a desired characteristic of the decomposing solution. Preferably, the additive can be contained in the decomposing solution in an amount of 3% by weight or less.

D. A Decomposing Method for the Structure Material and the Molded Product of the Present Invention A decomposing method for the structure material of the present invention includes the step of immersing the aforementioned structure material in the decomposing solution at a temperature lower than the boiling point of the decomposing solution.

A decomposing method for the molded product of the present invention includes the steps of immersing the molded product obtained by molding the structure material together with the metal in the decomposing solution at a temperature lower than the boiling point of the decomposing solution, and decomposing at least a part of the structure material forming the molded product, and then separating and collecting the metals.

The immersion time can be varied depending on the temperature. For example, in the case of the immersion in the decomposing solution at 60° C., the period of time required for the decomposition treatment can be shortened up to about ⅙ of the period of the time in the case of the immersion at room temperature. However, in order to prevent the hydrophilic solvent contained in the decomposing solution from volatilizing, it is desired that the temperature of the decomposing solution be below the boiling point of the hydrophilic solvent.

In the case where the molded product is subjected to the decomposition treatment, the separation and the collection of the metals is preferably performed in a state where the structure material remains moist. When the structure material is dry, the mechanical strength of the structure material becomes large, thus making it difficult to separate and collect the metals. Furthermore, the collection of the metals is preferably performed after the base contained in the decomposing solution is removed by washing. This is to ensure safety to the person involved. The washing is preferably performed using water and/or a hydrophilic solvent.

E. Function

The structure material of the present invention comprises a polymer mixture of a thermoplastic aromatic polyester and a thermoplastic aliphatic polyester, and the content of the thermoplastic aromatic polyester in the polymer mixture is larger than the content of the thermoplastic aliphatic polyester. For this reason, the structure material of the present invention has a structure where the thermoplastic aliphatic polyester in the form of particles are dispersed in the thermoplastic aromatic polyester. Analyzing the dispersing structure, the particles of the thermoplastic aliphatic polyester has a particle diameter on the order of several 10 $\mu$m or less, and particles having a particle diameter on the order of 100 $\mu$m do not substantially exist. In other words, the structure material of the present invention has a very fine-dispersed structure. Therefore, in the structure material of the present invention, an ester bond portion of the thermoplastic aromatic polyester and an ester bond portion of the thermoplastic aliphatic polyester can exist very closely. In addition, the portion where these ester bond portions exist closely can exist uniformly over the entire structure material.

On the other hand, the ester bond portion of the thermoplastic aliphatic polyester can be easily decomposed by the decomposing solution containing a base and a hydrophilic solvent. In other words, the decomposing solution permeates the structure material toward the ester bond portion of the thermoplastic aliphatic polyester. When the decomposing solution permeates the structure material and contacts the ester bond portion of the thermoplastic aliphatic polyester, the solution can also contact the ester bond portion of the aromatic polyester existing close to the ester bond portion of the aliphatic polyester. More specifically, by dispersing the aliphatic polyester in the aromatic polyester, the decomposing solution, which does not permeate inside in the case of the aromatic polyester alone, permeates and contacts the ester bond portion of the aromatic polyester. As a result, the aromatic polyester which is not decomposed when it is used alone is decomposed by the decomposing solution. Therefore, the structure material of the present invention can be decomposed easily by the decomposing solution while maintaining the mechanical strength and the heat resistance of the aromatic polyester.

Furthermore, generally, since the melting point of the thermoplastic aliphatic polyester is lower than that of the thermoplastic aromatic polyester, the shrinkage of the structure material by natural cooling after being molded can be prevented. In other words, the thermoplastic aliphatic polyester can function as a low shrink agent. For this reason, since the shrinkage of the structure material of the present invention after being molded is small, the shape and size of the molded product can be controlled precisely. Thus, the structure material of the present invention has excellent moldability.

As described above, the structure material of the present invention can be decomposed easily by the decomposing solution containing a base and a hydrophilic solvent. The decomposition is promoted by heating, but the heating temperature is at most below the boiling point of the hydrophilic solvent. In other words, the structure material of the present invention requires a significantly small quantity of heat for decomposition, compared with the conventional structure material requiring burning. Therefore, the change in the characteristics of valuable substances such as metals contained in the structure material is significantly small, the structure material of the present invention is very useful in view of recycling the valuable substances. Furthermore, The structure material of the present invention which does not require burning is very useful in view of the environment issues and the energy issues.

The molded product of the present invention which is molded using the aforementioned structure material can be decomposed easily by the decomposing solution containing a base and a hydrophilic solvent according to the above-described mechanism. Such advantages of the molded product of the present invention are provided in the case of the molded product containing metals. More specifically, the molded product of the present invention does not require burning or a crushing treatment unlike the conventional one. Therefore, since valuable metals are separated easily and collected, the molded product of the present invention is very useful with respect to recycling. Furthermore, by the decomposition of the structure material, the volume of the molded product can be reduced significantly. Thus, the molded product of the present invention is excellent in view of the reduction in volume of waste.

EXAMPLES

Example 1

Eighty parts by weight of polyethylene terephthalate (hereinafter, referred to as PET) represented by Formula (I) (DIANITE manufactured by Mitsubishi Rayon Co., Ltd.), which is a thermoplastic aromatic polyester, was melted by a kneader heated to 280° C. Then, 20 parts by weight of polycaprolactone represented by Formula (V) (having a molecular weight of 40,000; PLACCELL manufacture by Daicel Chemical Industries, Ltd.), which is a thermoplastic aliphatic polyester, was mixed thereto, and the mixture was kneaded for about 15 minutes to obtain a structure material.

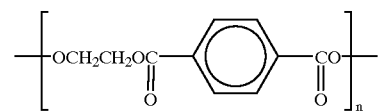

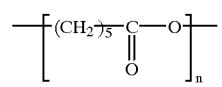

The obtained structure material was formed into a plate about 1 mm thick at about 250° C. The obtained plate-like molded product was cut into rectangular parallelepipeds having a size of 10 mm×20 mm×1 mm to obtain a sample for decomposition tests.

On the other hand, 16 parts by weight of sodium hydroxide was dissolved in 100 parts by weight of water to prepare a decomposing solution. Then, 30 cc of the decomposing solution and the sample obtained above were placed in an air-tight stainless container, and the content was stirred at 80° C. for 110 hours. After the completion of the stirring, a reduction of the weight of the sample was measured to evaluate decomposability. The results of the decomposition test are shown in Table 1, together with the results of Examples 2 to 4 and Comparative Example 1 described later.

TABLE 1

|  | Weight reduction of sample (%) |
| --- | --- |
| Example 1 | 40.2 |
| Example 2 | 38.6 |
| Example 3 | 21.0 |
| Example 4 | 17.7 |
| Comparative Example 1 | 3.0 |

As is apparent from Table 1, the reduction in the weight of the sample was about 40%, which was about twice the added amount of the thermoplastic aliphatic polyester. In other words, it was found out that at least about 20% of the thermoplastic aromatic polyester was decomposed. Therefore, it was determined that, by mixing the thermoplastic aliphatic polyester, the decomposition of the thermoplastic aromatic polyester is promoted significantly. Furthermore, the sample after the completion of the decomposition test had partially cracked, which makes it apparent that the separation of metals is easy in the case where the molded product contains the metals.

Furthermore, the decomposing solution after the completion of the decomposition test was neutralized with hydrochloric acid, and a precipitate generated in this case was examined by infrared spectroscopy. As a result, isophthalic acid and ethylene glycol were detected, and this indicates that the thermoplastic aromatic polyester is decomposed into a monomer unit. In other words, the structure material of the present invention is useful to collect and reuse isophthalic acid and ethylene glycol.

Example 2

A structure material was obtained in the same manner as in Example 1, except that 20 parts by weight of polylactic acid (LACTY manufactured by Shimadzu Corporation) represented by Formula (VI) was used instead of 20 parts by weight of polycaprolactone. Subsequently, the same procedure as in Example 1 was performed to prepare a sample for a decomposition test and the sample was subjected to the decomposition test in the same manner as in Example 1. The results are shown in Table 1. As a result, it was found that the decomposition of the thermoplastic aromatic polyester is promoted significantly as in Example 1. The sample after the completion of the decomposition test had partially cracked as in Example 1. Furthermore, as a result of infrared spectroscopy which was performed in the same manner as in Example 1, isophthalic acid and ethylene glycol were detected, and this indicates that the thermoplastic aromatic polyester was decomposed into a monomer unit.

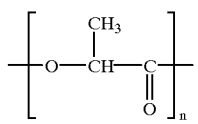

(VI)

Example 3

PET and polycaprolactone were moltened and kneaded in the same manner as in Example 1. Then, 100 parts by weight of heavy calcium carbonate having an average diameter of 20 μm (manufactured by Maruo Calcium Co., Ltd.) was added to the molten and kneaded product, and the resultant mixture was kneaded for about 10 minutes to obtain a structure material. Subsequently, the same procedure as in Example 1 was performed to prepare a sample for a decomposition test and the sample was subjected to the decomposition test in the same manner as in Example 1. The results are shown in Table 1.

As is apparent from Table 1, the reduction in the weight of the sample was about half of that in Examples 1 and 2. This is because calcium carbonate was not decomposed. The strength of the sample after the completion of the test deteriorated so significantly that the surface was detached easily with bare hands. Thus, it is apparent that in the case where the molded product contains metals, the separation of the metals is easy, even if a filler is added in order to improve the mechanical strength.

Furthermore, as a result of infrared spectroscopy which was performed in the same manner as in Example 1, isophthalic acid and ethylene glycol were detected, and this indicates that the thermoplastic aromatic polyester is decomposed into a monomer unit.

Example 4

PET and polycaprolactone were kneaded in the same manner as in Example 1. Then, 100 parts by weight of heavy calcium carbonate having an average diameter of 20 μm (manufactured by Maruo Calcium Co., Ltd.) and 30 parts by weight of glass fibers having a length of 20 mm were sequentially added to the molten and kneaded product, and the resultant mixture was kneaded for about 15 minutes to obtain a structure material. Subsequently, the same procedure as in Example 1 was performed to prepare a sample for a decomposition test and the sample was subjected to the decomposition test in the same manner as in Example 1. The results are shown in Table 1.

As is apparent from Table 1, the reduction in the weight of the sample was about the same extent as that in Example 3. The strength of the sample after the completion of the test deteriorated so significantly that the surface was detached easily with bare hands, as in Example 3. Thus, it is apparent that in the case where the molded product contains metals, the separation of the metals is easy, even if a filler is added in order to improve mechanical strength.

Furthermore, as a result of infrared spectroscopy which was performed in the same manner as in Example 1, large amounts of isophthalic acid and ethylene glycol were detected, and this indicates that the thermoplastic aromatic polyester was decomposed into a monomer unit.

Comparative Example 1

A structure material was obtained in the same manner as in Example 1, except that only PET was used. Subsequently, the same procedure as in Example 1 was performed to prepare a sample for a decomposition test and the sample was subjected to the decomposition test in the same manner as in Example 1. The results are shown in Table 1.

As is apparent from Table 1, the weight of the sample was reduced by only 3% by weight. Furthermore, as a result of infrared spectroscopy which was performed in the same manner as in Example 1, only small amounts of isophthalic acid and ethylene glycol were detected. In other words, it was found that the structure material of Comparative Example 1 was only decomposed in a minute amount, and was not decomposed to such an extent that it structurally collapsed.

Example 5

The decomposability of the structure material was evaluated in the same manner as in Example 1, except that the decomposition test was performed at 100° C. As a result, the weight of the sample for the decomposition test was reduced to the same extent as in Example 1 (i.e., about 40% by weight) in as short as about 30 hours. This indicates that by heating the decomposing solution, the decomposition rate becomes significantly high.

Example 6

The same structure material as used in Example 3 was used to form a plate-like molded product having a size of 20 mm×40 mm×7 mm, and this molded product was used as a sample for a decomposition test. The sample was immersed in the same decomposing solution as in Example 1 to a thickness of 1 mm in its thickness direction. The decomposability was evaluated by the level of softness of the sample after 100 hours and after 500 hours. The level of the softness was evaluated by the thickness of the softened portion from the surface of the sample in the immersed side.

As a result, the sample was softened to a thickness of about 3 mm from the surface of the sample in the immersed side after 100 hours, and substantially the entire sample (about 7 mm from the surface of the sample in the immersed side) was softened after 500 hours.

Example 7

A sample for a decomposition test was prepared in the same manner as in Example 6, except that 200 parts by weight of heavy calcium carbonate was used, and the decomposability thereof was evaluated.

As a result, the sample was softened to a thickness of about 3 mm from the surface of the sample in the immersed side after 100 hours, and substantially the entire sample (about 7 mm from the surface of the sample in the immersed side) was softened after 500 hours.

Example 8

A sample for a decomposition test was prepared in the same manner as in Example 6, except that 400 parts by weight of heavy calcium carbonate was used, and the decomposability thereof was evaluated.

As a result, the sample was softened to a thickness of about 2 mm from the surface of the sample in the immersed side after 100 hours, and substantially the entire sample (about 7 mm from the surface of the sample in the immersed side) was softened after 500 hours.

Comparative Example 2

A sample for a decomposition test was prepared in the same manner as in Example 6, except that 500 parts by weight of heavy calcium carbonate was used, and the decomposability thereof was evaluated.

As a result, the sample was softened only to a thickness of about 1 mm from the surface of the sample in the immersed side after 500 hours.

Example 9

A sample for a decomposition test was prepared in the same manner as in Example 1. On the other hand, as shown in Table 2, 30 parts by weight of ethanol and 1.25 parts by weight of sodium hydroxide were mixed to prepare a decomposing solution. The sample was immersed in the obtained decomposing solution at room temperature for 15 hours. A reduction in the weight of the sample after the immersion was measured to evaluate the decomposability. The results are shown in Table 3, together with the results of Example 10 and Comparative Example 3, which are described later.

TABLE 2

|  | Sodium hydroxide | Water | Ethanol |
| --- | --- | --- | --- |
| Example 9 | 1.25 | 0 | 30 |
| Example 10 | 1.25 | 6 | 24 |
| Comparative Example 3 | 0.00 | 6 | 24 |

(Unit: Part by weight)

TABLE 3

|  | Weight reduction of sample (%) |
| --- | --- |
| Example 9 | 35.2 |
| Example 10 | 64.5 |
| Comparative Example 3 | 0.0 |

As is apparent from Table 3, the weight reduction of the sample was about 35% by weight, and it was found that the structure material of the present invention was satisfactorily decomposed by the decomposing solution. Furthermore, the volume of the sample was significantly reduced, and it was found that the structure material of the present invention was useful in view of the reduction in volume of waste.

Example 10

The decomposability of the structure material was evaluated in the same manner as in Example 9, except that the decomposing solution shown in Table 2 was used. The results are shown in Table 3.

As is apparent from Table 3, the weight reduction of the sample was about 65% by weight, which is about twice the reduction in Example 9. This revealed that, by using a mixed solvent of a base and a hydrophilic solvent, the decomposition of the structure material was significantly promoted. Furthermore, the volume of the sample was significantly reduced, and it was found that the structure material of the present invention was useful in view of the reduction in volume of waste.

Comparative Example 3

The decomposability of the structure material was evaluated in the same manner as in Example 9, except that the decomposing solution as shown in Table 2 was used and the sample was immersed at 80° C. The results are shown in Table 3.

As is apparent from Table 3, in spite of heating to 80° C., the sample (i.e., the structure material) was not substantially decomposed.

Example 11

The decomposability was evaluated in the same manner as in Example 10, except that methanol was used instead of ethanol. As a result, as in Example 10, the structure material was significantly decomposed. Furthermore, the volume of the structure material was significantly reduced.

Example 12

A sample for a decomposition test was prepared in the same manner as in Example 3. Subsequently, the same procedure as in Example 9 was performed to evaluate the decomposability. As a result, as in Example 9, the structure material was significantly decomposed. Furthermore, the volume of the structure material was significantly reduced.

Example 13

The decomposability was evaluated in the same manner as in Example 9, except that the sample was immersed at 60° C. As a result, the weight of the sample was reduced by about 35% in 2 hours after immersion. This indicates that the decomposition of the structure material was significantly promoted by heating.

Example 14

The decomposability was evaluated in the same manner as in Example 10, except that the sample was immersed at 60° C. As a result, the weight of the sample was reduced by about 65% in 2 hours after immersion. This indicates that the decomposition of the structure material was significantly promoted by heating, as in Example 13.

Comparative Example 4

A sample for a decomposition test was prepared in the same manner as in Comparative Example 1. The decomposability was evaluated in the same manner as in Example 9, except that the sample was immersed at 80° C. The results revealed that the weight of the sample was not substantially changed, and the structure material was not substantially decomposed.

Comparative Example 5

A sample for a decomposition test was prepared in the same manner as in Comparative Example 1. The decomposability was evaluated in the same manner as in Example 10, except that the sample was immersed at 80° C. The results revealed that the weight of the sample was not substantially changed, and the structure material was not substantially decomposed.

Example 15

A structure material was obtained in the same manner as in Example 1. The structure material was integrally molded with an iron core wound by a wire which is an enamelled wire to produce a molded motor as shown in FIG. 1. The maximum thickness of the molded section was 5 mm.

On the other hand, 24 parts by weight of ethanol, 6 parts by weight of water and 1.25 parts by weight of sodium hydroxide were mixed to prepare a decomposing solution. The molded motor produced in the above-mentioned manner was immersed in the decomposing solution at 60° C. for 10 hours. As a result, the molded section (i.e., the structure material) was substantially decomposed, and the wire and the iron core were completely separated.

Example 16

A structure material was obtained in the same manner in Example 2. Subsequently, the same procedure as in Example 15 was performed to produce a molded motor and to immerse the molded motor in the decomposing solution. As a result, the molded section (i.e., the structure material) was substantially decomposed, and the wire and the iron core were completely separated.

Example 17

A structure material was obtained in the same manner in Example 3. Subsequently, the same procedure as in Example 15 was performed to produce a molded motor and to immerse the molded motor in the decomposing solution. As a result, the molded section (i.e., the structure material) slightly remained, but the molded section was easily removed simply by tapping the surface thereof with a hammer. Then, the wire and the iron core were completely separated.

Furthermore, calcium carbonate contained in the structure material was separated. This indicates that the structure material of the present invention is useful in view of the reuse of an inorganic filler.

Example 18

A structure material was obtained in the same manner in Example 4. Subsequently, the same procedure as in Example 15 was performed to produce a molded motor and to immerse the molded motor in the decomposing solution. As a result, the molded section (i.e., the structure material) slightly remained, but the molded section was removed easily simply by tapping the surface thereof with a hammer. Then, the wire and the iron core were completely separated.

Furthermore, calcium carbonate and glass fibers contained in the structure material were separated also. This indicates that the structure material of the present invention is also useful in view of the reuse of an inorganic filler and the glass fibers. Especially, with respect to the glass fibers, since the glass fibers have not been subjected to a crushing treatment or heating at a high temperature, such glass fibers can be reused in an excellent state without no characteristic change or break.

Comparative Example 6

A structure material was obtained in the same manner in Comparative Example 1. Subsequently, the same procedure as in Example 15 was performed to produce a molded motor and to immerse the molded motor in the decomposing solution. The molded section (i.e., the structure material) was not decomposed to a great extent, and when the surface of the molded section was tapped with a hammer, the surface was only slightly detached, but the wire and the iron core were not separated from the molded section.

Comparative Example 7

A molded motor was produced in the same manner as in Example 15, except that polycaprolactone alone was used as the structure material. However, in the molded motor, the mechanical strength of the molded section was extremely low, and it was impossible to put it into practical use as a molded motor.

Comparative Example 8

A molded motor was produced in the same manner as in Example 15, except that polylactic acid alone was used as the structure material. However, in the molded motor, as in Comparative Example 7, the mechanical strength of the molded section was extremely low, and it was impossible to put it into practical use as a molded motor.

Example 19

A structure material was obtained in the same manner as in Example 1. The structure material and an iron core wound by a wire via the structure material were subjected to pressure molding at about 250° C. in such a manner that the structure was not deformed, so as to form an internal molded section. The maximum thickness of the internal molded section was about 2 mm.

On the other hand, 70 parts by weight of unsaturated polyester resin (EPOLAC manufactured by Nippon Shokubai Co., Ltd.) containing unsaturated polyester represented by Formula (XIII), 30 parts by weight of styrene, 1 part by weight of t-butylperoxybenzoate (PERBUTYL Z manufactured by Nippon Oil and Fats Co., Ltd.), 200 parts by weight of heavy calcium carbonate (Maruo Calcium Co., Ltd.) having an average diameter of 20 μm and 30 parts by weight of glass fibers having a length of 20 mm were mixed to prepare a molding compound for forming an external molded section.

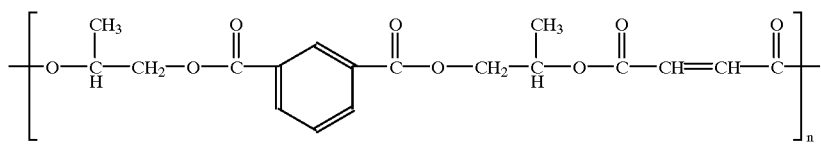
(XIII)

The iron core where the internal molded section was formed and the molding compound for forming an external molded section were integrally molded to form the external molded section. Thus, a molded motor as shown in FIG. 2 was produced. The maximum thickness of the external molded section was about 6 mm.

After a part of the external molded section of the obtained molded motor was exposed by cutting the external molded section, the molded motor was immersed in a decomposing solution containing 24 parts by weight of ethanol, 6 parts by weight of water and 1.25 parts by weight of sodium hydroxide at room temperature for 48 hours. As a result, the internal molded section was almost decomposed, and a hollow portion was formed between the external molded section and the iron core and the wire. Thus, the iron core and the wire was separated and collected easily.

Example 20

Polybutylene terephthalate (hereinafter, referred to as PBT) represented by Formula (II) (TUFPET manufactured by Mitsubishi Rayon Co., Ltd.) was used as a thermoplastic aromatic polyester. Polylactic acid (LACTY manufactured by Shimadzu Corporation) represented by Formula (VI) was used as a thermoplastic aliphatic polyester. Eighty parts by weight of the PBT and 20 parts by weight of the polylactic acid were moltened and kneaded by a biaxial extruder at 240° C. so as to obtain a structure material. The structure material was formed into a form where a thickness thereof was about 1 mm and the iron core could be disposed in the inside thereof. The iron core was disposed in the inside of the molded product, and was wound by an enamelled wire on its circumference. Thus, the iron core wound by a wire via an insulator (hereinafter, referred to as a stator) was produced.

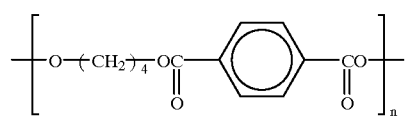
(II)

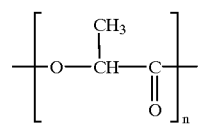
(VI)

On the other hand, 1 part by weight of sodium hydroxide and 25 parts by weight of water were mixed to prepare a decomposing solution. The obtained stator was immersed in the decomposing solution at 80° C. As a result, the insulator (i.e., the structure material) was decomposed and removed in about 70 hours. Thus, the iron core and the wire were separated and collected.

Example 21

A molded motor was produced in the same manner as in Example 20. The molded motor was crushed by a shredder and the debris were selected so that low-quality metals (iron core and wire) to which an insulator was attached in large quantity were collected. The low-quality metals were immersed in a decomposing solution containing 24 parts by weight of ethanol, 6 parts by weight of water and 1.25 parts by weight of sodium hydroxide at room temperature for 50 hours. Then, a treatment was performed by a rolling mixer for about 1 hour. As a result, extremely high-quality metals from which the insulator was completely removed were collected.

Example 22

A stator was produced in the same manner as in Example 20, except that 90 parts by weight of PBT and 10 parts by weight of polybutylene succinate represented by Formula (X) (BIONOLLE manufactured by Showa High Polymer Co., Ltd.) were used as a structure material. Subsequently, the same procedure as in Example 20 was performed and the stator was immersed in the decomposing solution at 80° C. As a result, the insulator (i.e., the structure material) was decomposed and removed in about 150 hours. Thus, the iron core and the wire were separated and collected.

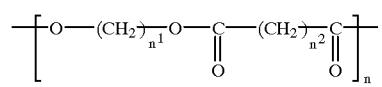
(X)

Example 23

Seventy parts by weight of unsaturated polyester resin (EPOLAC manufactured by Nippon Shokubai Co., Ltd.) containing unsaturated polyester represented by Formula (XIII), 30 parts by weight of styrene, 1 part by weight of t-butylperoxybenzoate (PERBUTYL Z; manufactured by Nippon Oil and Fats Co., Ltd.) as a curing agent, 200 parts by weight of heavy calcium carbonate (manufactured by Maruo Calcium Co., Ltd.) having an average diameter of 20 μm and 30 parts by weight of glass fibers having a length of 20 mm were mixed to prepare a molding compound for forming a molded section.

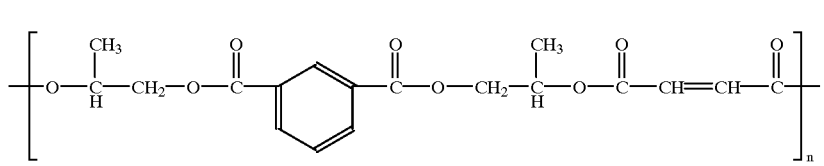

(XIII)

The structure material of Example 20 was used for an insulator. An iron core wound by a wire via the insulator and the molding compound for forming the molded section were integrally molded so that the insulator was exposed flush with the surface of the molded product. Thus, a molded motor as shown in FIG. 3 was produced.

This molded motor was immersed in the decomposing solution of Example 20 at 80° C. for 200 hours. As a result, the insulator (i.e., the structure material) was dissolved and a hollow was formed between the molded section and the iron core and the wire. Thus, the iron core and the wire were readily separated and collected.

Example 24

Eighty-five parts by weight of polybutylene terephthalate (TUFPET manufactured by Mitsubishi Rayon Co., Ltd.) and 15 parts by weight of polybutylene succinate (BIONOLLE manufactured by Showa High Polymer Co., Ltd.) were moltened and kneaded by an extruder at 250° C. so as to obtain a structure material. The structure material was heated at 250° C. and pressurized to be formed into a sheet having a thickness of 50 μm. Thus, a substrate was produced. A Co—Ni alloy (70/30) as a recording material was deposited to a thickness of 0.2 μm on the substrate under a vacuum to form a recording layer. The sheet on which the recording layer was formed was cut into stripes having a width of 4 mm to obtain a magnetic tape.

The obtained magnetic tape was immersed in an aqueous solution of 5% by weight of sodium hydroxide at 80° C. for 2 hours. As a result, the substrate was completely decomposed and only a recording layer was left in the decomposing solution. Thus, the valuable recording material was separated and collected.

Comparative Example 9

A magnetic tape was prepared in the same manner as in Example 24, except that the substrate was composed of polyethylene terephthalate alone. Then, the magnetic tape was immersed in the decomposing solution. As a result, the substrate cracked so slightly that the recording material could not be separated nor collected.

Industrial Applicability

As described above, the present invention provides: (1) a structure material which has excellent mechanical strength and heat resistance, and is decomposed easily at the time of disposal; (2) a structure material having excellent moldability; (3) a molded product which has exceptional mechanical strength and heat resistance, and is decomposed easily at the time of disposal; (4) a molded product from which valuable metals are collected easily; (5) a molded product which is easily reduced in volume; (6) a useful molded product in view of environmental issues and energy issues; (7) a useful molded product in view of recycling; and (8) a simple and easy method for decomposing such a structure material and such a molded product.

What is claimed is:

1. A structure material consisting essentially of 20 parts by weight or more of a polymer mixture on the basis of 100 parts by weight of the structure material, wherein the polymer mixture consists essentially of (A) a thermoplastic aromatic polyester; and (B) a thermoplastic aliphatic polyester,
wherein a content of the thermoplastic aromatic polyester in the polymer mixture is larger than a content of the thermoplastic aliphatic polyester,
wherein the thermoplastic aromatic polyester is obtained by condensation-polymerizing at least one aromatic polybasic acid and at least one glycol, and the at least one aromatic polybasic acid is selected from the group consisting of phthalic anhydride, isophthalic acid, terphthalic acid, diphenyl carboxylic acid and combinations thereof, and the at least one glycol is selected from the group consisting of ethylene glycol, propylene glycol, diethylene glycol, dipropylene glycol, neopentyl glycol, hexamethylene glycol, polyethylene glycol, butanediol and combinations thereof,
wherein the thermoplastic aliphatic polyester is at least one selected from the group consisting of polycaprolactone, polycaprolactone diol, polycaprolactone triol, polyethylene succinate, polybutylene succinate, and polylactic acid,
wherein the polymer mixture comprises 3 to 40 parts by weight of the aliphatic polyester on the basis of 100 parts by weight of the polymer mixture, and
wherein the polymer mixture can be decomposed into a monomer unit by a decomposing solution containing a base and a hydrophilic solvent.

2. A molded product formed of a structure material,
wherein the structure material consisting essentially of 20 parts by weight or more of a polymer mixture on the basis of 100 parts by weight of the structure material, wherein the polymer mixture consists essentially of (A) a thermoplastic aromatic polyester; and (B) a thermoplastic aliphatic polyester, and a content of the thermoplastic aromatic polyester in the polymer mixture is larger than a content of the thermoplastic aliphatic polyester, and
wherein the thermoplastic aromatic polyester is obtained by condensation-polymerizing at least one aromatic polybasic acid and at least one glycol, and the at least one aromatic polybasic acid is selected from the group consisting of phthalic anhydride, isophthalic acid, terephthalic acid, diphenyl carboxylic acid and combinations thereof, and the at least one glycol is selected from the group consisting of ethylene glycol, propylene glycol, diethlylene glycol, dipropylene glycol, neopentyl glycol, hexamethylene glycol, polyethylene glycol, butanediol and combinations thereof, wherein the thermoplastic aliphatic polyester is at least one selected from the group consisting of polycanrolactone, polycaprolactone diol, polycaprolactone triol, polyethylene succiante, polybutylene succinate and polylactic acid, wherein the polymer mixture comprises 3 to 40 parts by weight of the aliphatic polyester on the basis of 100 parts by weight of the polymer mixture, and wherein the polymer mixture can be decomposed into a monomer unit by a decomposing solution containing a base and a hydrophilic solvent.

3. A molded product according to claim 2, being a recording medium comprising a substrate formed of the structure material and a recording layer provided on the substrate.

4. A molded product according to claim 2, being selected from the group consisting of a magnetic tape, a magnetic disc, an opto-magnetic disc and a phase change type optical disc.

5. A molded product according to claim 2, being formed by molding the structure material together with at least a metal.

6. A molded product according to claim 5, being a molded motor having a molded section formed of the structure material integrally molded containing the metal, the structure material containing an inorganic filler.

7. A molded product according to claim 6, wherein the molded section includes an internal molded section covering the metal and an external molded section which is provided outside the internal molded section and whose outermost portion defines an outermost portion of the molded product, the internal molded section being formed of the structure material, the external molded section being formed of a molding compound containing a thermosetting resin.

8. A molded product according to claim 5, being a molded motor having a molded section formed of the structure material integrally molded containing the metal and an insulator, a part of the insulator penetrating the molded section and being exposed flush with the surface of the molded section.

9. A molded product according to claim 8, the molded section being formed of a molding compound containing a thermosetting resin, the insulator comprising 20 parts by weight or more of a polymer mixture of a thermoplastic aromatic polyester and a thermoplastic aliphatic polyester on the basis of 100 parts by weight of the insulator, the aliphatic polyester being at least one selected from the group consisting of polycaprolactone, polycaprolactone diol, polycaprolactone triol, polyethylene succinate, polybutylene succinate and polylactic acid.

10. A decomposing method for a structure material, wherein the structure material consisting essentially of 20 parts by weight or more of a polymer mixture on the basis of 100 parts by weight of the structure material, wherein the polymer mixture consists essentially of (A) a thermoplastic aromatic polyester; and (B) a thermoplastic aliphatic polyester, and a content of the thermoplastic aromatic polyester in the polymer mixture is larger than a content of the thermoplastic aliphatic polyester, wherein the thermoplastic aromatic polyester is obtained by condensation-polymerizing at least one aromatic polybasic acid and at least one glycol, and the at least one aromatic polybasic acid is selected from the group consisting of phthalic anhydride isophthalic acid terephthalic acid, diphenyl carboxylic acid and combinations thereof, and the at least one glycol is selected from the group consisting of ethylene glycol, propylene glycol, diethylene glycol, dipropylene glycol, neopentyl glycol, hexamethylene glycol, polyethylene glycol, butanediol and combinations thereof, wherein the thermoplastic aliphatic polyester is at least one selected from the group consisting of polycaprolactone, polycaprolactone diol, polycaprolactone triol, polyethylene succinate, polybutylene succinate and polylactic acid, and wherein the polymer mixture comprises 3 to 40 parts by weight of the aliphatic polyester on the basis of 100 parts by weight of the polymer mixture, the method comprising the step of immersing the structure material in a decomposing solution containing a base and a hydrophilic solvent at a temperature lower than the boiling point of the hydrophilic solvent.

11. A decomposing method for a molded product formed by molding a structure material together with at least a metal, wherein the structure material consisting essentially of 20 parts by weight or more of a polymer mixture on the basis of 100 parts by weight of the structure material, wherein the polymer mixture consists essentially of (A) a thermoplastic aromatic polyester; and (B) a thermoplastic aliphatic polyester, and a content of the thermoplastic aromatic polyester in the polymer mixture is larger than a content of the thermoplastic aliphatic polyester, wherein the thermoplastic aromatic polyester is obtained by condensation-polymerizing at least one aromatic polybasic acid and at least one glycol, and the at least one aromatic polybasic acid is selected from the group consisting of phthalic anhydride, isophthalic acid, terephthalic acid, diphenyl carboxylic acid and combinations thereof, and the at least one glycol is selected from the group consisting of ethylene glycol, propylene glycol, diethylene glycol, dipropylene glycol, neopentyl glycol, hexamethylene glycol, polyethylene glycol, butanediol and combinations thereof, wherein the thermoplastic aliphatic polyester is at least one selected from the group consisting of polycaprolactone, polycaprolactone diol, polycaprolactone triol, polyethylene succinate, polybutylene succinate and polylactic acid, wherein the polymer mixture comprises 3 to 40 parts by weight of the aliphatic polyester on the basis of 100 parts by weight of the polymer mixture, the method comprising the steps of:
immersing the molded product in a decomposing solution containing a base and a hydrophilic solvent at a temperature lower than the boiling point of the hydrophilic solvent, and
decomposing at least a part of the structure material forming the molded product and then separating and collecting the metal.

12. A method according to claim 11, wherein the hydrophilic solvent is a mixed solvent of water and lower alcohol.

13. A method according to claim 11, wherein the separation and collection of the metal is preformed in a state where the structure material remains moist.

* * * * *

UNITED STATES PATENT AND TRADEMARK OFFICE
CERTIFICATE OF CORRECTION

PATENT NO. : 6,673,463 B1
DATED : January 6, 2004
INVENTOR(S) : Onishi et al.

It is certified that error appears in the above-identified patent and that said Letters Patent is hereby corrected as shown below:

Title page,
Item [56], References Cited, U.S. PATENT DOCUMENTS, please insert the following:
-- 4,806,586   02/1989      Nakai
   4,921,670   05/1990      Dallmann et al. --
Item [74], *Attorney, Agent, or Firm*, "Boiselle" should read -- Boisselle --.
Item [57], ABSTRACT,
Line 3, "essentially of of" should read -- essentially of --.

Signed and Sealed this

Twenty-fifth Day of May, 2004

JON W. DUDAS
*Acting Director of the United States Patent and Trademark Office*